UNITED STATES PATENT OFFICE.

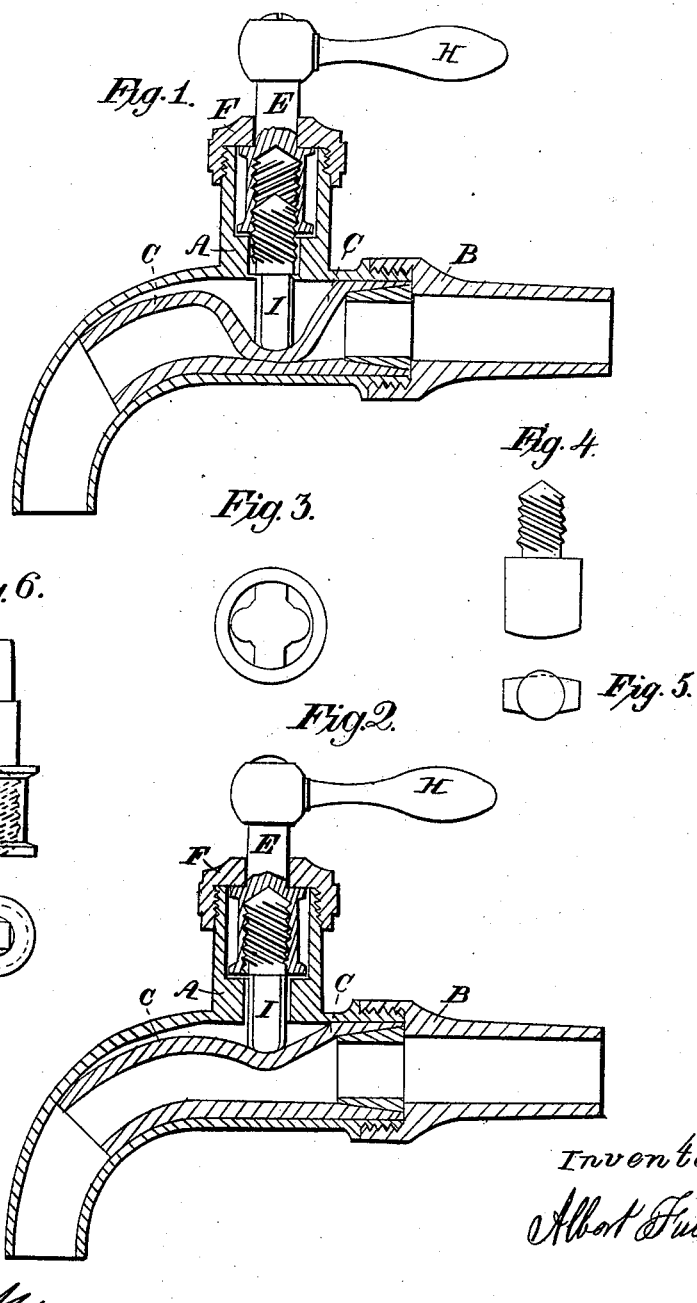

ALBERT FULLER, OF CINCINNATI, OHIO.

IMPROVEMENT IN FAUCETS.

Specification forming part of Letters Patent No. 34,419, dated February 18, 1862.

*To all whom it may concern:*

Be it known that I, ALBERT FULLER, of Cincinnati, in the county of Hamilton, in the State of Ohio, have invented a new and useful Improvement in Water-Faucets; and I do hereby declare that the following is a full and exact description thereof, reference being had to the accompanying drawings, and to the letters of reference marked thereon.

In the construction of compression faucets the plans hitherto universally adopted have permitted the fluid to come in contact with and flow into the working parts of the faucet, rendering it necessary, in order to prevent the constant escape of the fluid, to use ground-joints, springs, and packing, which, notwithstanding their additional cost, have utterly failed to accomplish their purpose, for whenever the fluid has free access to the working and moving parts of a faucet those parts have been found soon to become so worn and leaky as to be worthless. The second leading objection to the old compression faucets has been that they were so constructed as to retain a portion of the fluid directly under the valve-seat in the place most exposed to the action of frost. In cold weather it frequently happens that by the freezing of this fluid the valve-seat is moved from its proper place or the cylinder of the faucet split or otherwise damaged. In my invention I have sought to avoid the above-described evils, while at the same time I prevent the water-hammer or percussion attending the ordinary plug faucets.

My improvement consists in the application of an interior elastic tube or elastic tube lining to faucets in such manner as to render them always tight, more durable, and less expensive, while at the same time the percussion or water-hammer occasioned by the sudden stoppage of the fluid in the ordinary plug faucet is entirely prevented. The fluid is not permitted to come in contact with or to flow into the moving or working parts of the faucet, thereby dispensing with ground joints or packing, and all fluid is excluded from beneath the valve, thus preventing injury from frost. While obviating these difficulties my improvement leaves an unobstructed waterway, keeps the working or moving part of the faucet clear and dry, and prevents the wear by sandy or impure liquids so common in ordinary compression faucets.

To enable others skilled in the art to make and use my invention, I will proceed to describe the several parts thereof as illustrated in the accompanying drawings.

Figure 1 represents a longitudinal view of my improved faucet when shut. Fig. 2 represents the same view when open. Fig. 3 represents a sectional view of the gateway. Fig. 4 represents a side view of the plunger or gate I. Fig. 5 represents an end view of the same. Fig. 6 represents the revolving shaft E. Fig. 7 represents an end view of the cap F.

The body part of my faucet is cast in two pieces, (marked A and B,) which are screwed together, as shown in Figs. 1 and 2.

C represents the elastic tube lining as applied in my improvement to the interior of the faucet. This tube is pressed into the cylinder portion of the faucet as far as and into the nozzle past the gateway or point at which the operation of opening and closing takes place, and so preventing all contact of the liquid with the working or moving parts.

D represents a metallic conoidal tube placed within the elastic tube or lining C at the upper end, and so expanding the latter as to fill and press it against the outer cylinder of the faucet, thus making a perfect joint. There is a shoulder upon the back piece B of the body of the faucet, which, when A and B are screwed together, presses upon the tube D, forcing it into its proper place in the end of the elastic tube, from which it cannot be displaced by the fluid or action of the working parts, thus preventing all possible escape of the liquid to the operating parts of the faucet and obviating the necessity for ground joints and packing.

E represents a revolving shaft, having female screw-threads to receive the corresponding male screw-threads of the gate-plunger I. The shaft B is connected with and operated by the lever-handle H in the usual way.

F represents the cap, which is screwed to the part A of the body of the faucet to prevent the revolving shaft E from rising or falling when turned by handle H.

It is obvious that by turning handle H and shaft E the plunger I is raised or lowered, compressing or expanding the tube C, and thus regulating and preventing the flow of liquid through the faucet.

Having thus fully described my invention, what I claim as new, and desire to secure by Letters Patent, is—

1. A faucet having an interior elastic tube by the compression and expansion of which the flow of liquid may be regulated or prevented, substantially as described.

2. The application of the conoidal tube D to the elastic tube C for the purpose of securing the latter, substantially as described.

ALBERT FULLER.

Witnesses:
SAML. S. FISHER,
J. F. BALDWIN.